(Model.)

C. B. BROWN.
DOOR KNOB ATTACHMENT.

No. 273,943.  Patented Mar. 13, 1883.

Attest:
Charles Pickles
Albert G. Fish

Inventor:
Charles B. Brown
By Knight Bros.
Attys.

UNITED STATES PATENT OFFICE.

CHARLES B. BROWN, OF ST. LOUIS, MISSOURI.

DOOR-KNOB ATTACHMENT.

SPECIFICATION forming part of Letters Patent No. 273,943, dated March 13, 1883.

Application filed September 16, 1882. (Model.)

*To all whom it may concern:*

Be it known that I, CHARLES B. BROWN, of the city of St. Louis, in the State of Missouri, have invented a certain new and useful Improvement in Devices for Attaching Door-Knobs, of which the following is a full, clear, and exact description, reference being had to the accompanying drawings, forming part of this specification.

My invention relates to those devices for attaching door-knobs in which a spindle having grooved and slotted ends and set-screws with conical points are employed for attaching said knobs.

My improvement consists in recessing each side of the socket in the door-knob, so that when the set-screw is passed into the slot the divided portion of the shank may be expanded into said recesses and form projections which will prevent the knob from moving either inward or outward, as hereinafter described.

Figure 1:
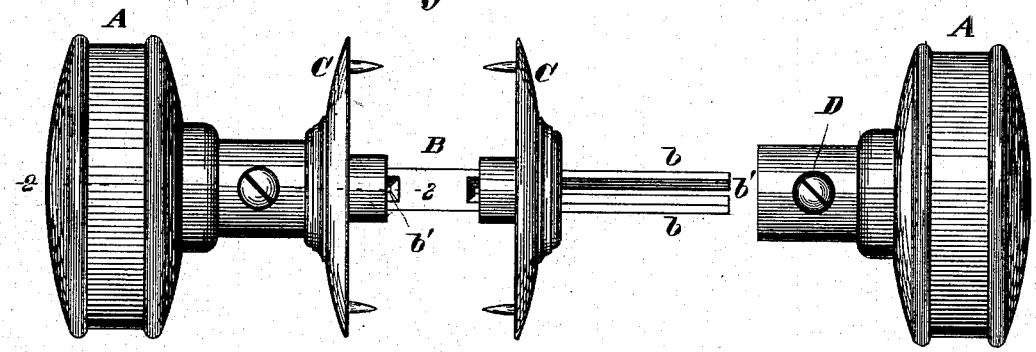
Figure 2:
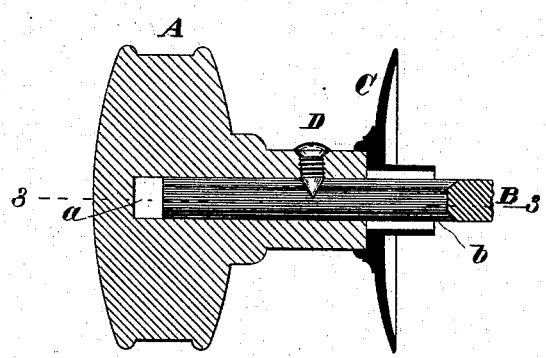
Figure 3:
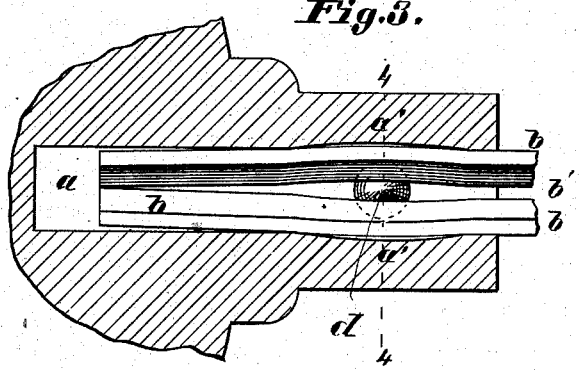
Figure 4:
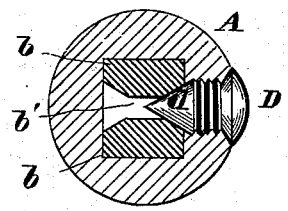

Figure 1 is a side view of the spindle and two knobs, one of the knobs being detached. Fig. 2 is a section at 2 2, Fig. 1. Fig. 3 is an enlarged detail section at 3 3, Fig. 2. Fig. 4 is a transverse section at 4 4, Fig. 3.

The door-knobs are shown at A, the spindle at B, and the roses at C. The spindle is angular from end to end, and is slotted at the end, forming it into two bars, $b\ b$, with slot $b'$ between them. I bevel the inner corners of the bars (see Fig. 4) to form a good bearing for the conical point $d$ of the set-screw D. The shank and handle or knob have an axial mortise to receive the end of the spindle in the usual manner; but the mortise $a$ has two recesses at $a'\ a'$, in proximity to the set-screw D, the recesses being so arranged that the pressure of the conical point of the screw against the inner sides of the bars $b\ b$ will spring or bend them outward into the recesses $a'$, thus forming an expansion in the spindle that occupies the recesses, and wholly prevents any movement of the knob upon the spindle, either inward or outward. Thus it will be seen that the knob may be adjusted to the rose or to the lock with the greatest nicety, and can neither move inward to bind against the rose (or lock) nor move outward to render the parts loose.

I claim as my invention—

The door-knob A, formed with a mortise or socket having recesses $a'\ a'$ on opposite sides, in combination with a grooved and slotted spindle and a set-screw adapted to force or project the divided portion of the spindle into the said recesses, as set forth.

CHAS. B. BROWN.

Witnesses:
SAML. KNIGHT,
ALBERT G. FISH.